US008006058B2

(12) United States Patent
Benoit

(10) Patent No.: US 8,006,058 B2
(45) Date of Patent: Aug. 23, 2011

(54) METHOD AND SECURING ELECTRONIC DEVICE DATA PROCESSING

(75) Inventor: Olivier Benoit, Quebec (CA)

(73) Assignee: Gemalto SA, Meudon (FR)

( * ) Notice: Subject to any disclaimer, the term of this patent is extended or adjusted under 35 U.S.C. 154(b) by 1087 days.

(21) Appl. No.: 10/416,754

(22) PCT Filed: Nov. 15, 2001

(86) PCT No.: PCT/FR01/03582
§ 371 (c)(1),
(2), (4) Date: Oct. 20, 2003

(87) PCT Pub. No.: WO02/41151
PCT Pub. Date: May 23, 2002

(65) Prior Publication Data
US 2004/0093306 A1    May 13, 2004

(30) Foreign Application Priority Data
Nov. 16, 2000    (CA) ..................... 2326036

(51) Int. Cl.
*G06F 12/14*    (2006.01)
(52) U.S. Cl. ................. 711/170; 711/103; 711/E12.091
(58) Field of Classification Search ........................ None
See application file for complete search history.

(56) References Cited

U.S. PATENT DOCUMENTS

| 5,081,675 | A | * | 1/1992 | Kittirutsunetorn | ........... 713/190 |
| 5,303,197 | A | * | 4/1994 | Miyashita et al. | ............ 365/210 |
| 5,602,995 | A | * | 2/1997 | Hendel et al. | ................. 711/209 |
| 5,969,632 | A | * | 10/1999 | Diamant et al. | ................ 340/5.3 |
| 6,115,760 | A | * | 9/2000 | Lo et al. | .......................... 710/52 |
| 6,268,789 | B1 | * | 7/2001 | Diamant et al. | ............. 340/5.74 |
| 7,003,673 | B1 | * | 2/2006 | Diener et al. | ................. 713/190 |

FOREIGN PATENT DOCUMENTS

| WO | WO 93/23806 | 11/1993 |
| WO | WO 00/36511 | 6/2000 |

* cited by examiner

*Primary Examiner* — Shane M Thomas
*Assistant Examiner* — Ryan Dare
(74) *Attorney, Agent, or Firm* — Buchanan Ingersoll & Rooney PC

(57) ABSTRACT

A method for securing electronic device processes against attacks (e.g. side channel attacks) during the processing of sensitive and/or confidential data by a Central Processing Unit (CPU) to the volatile memory (e.g. RAM) of an electronic device such as, for example, a smart card, a PDA or a cellular phone is described herein. The method involves the storage of the confidential data to a dynamically and randomly assigned memory location, thereby rendering more difficult the analysis and subsequently the attacks (e.g. side channel attacks).

7 Claims, 4 Drawing Sheets

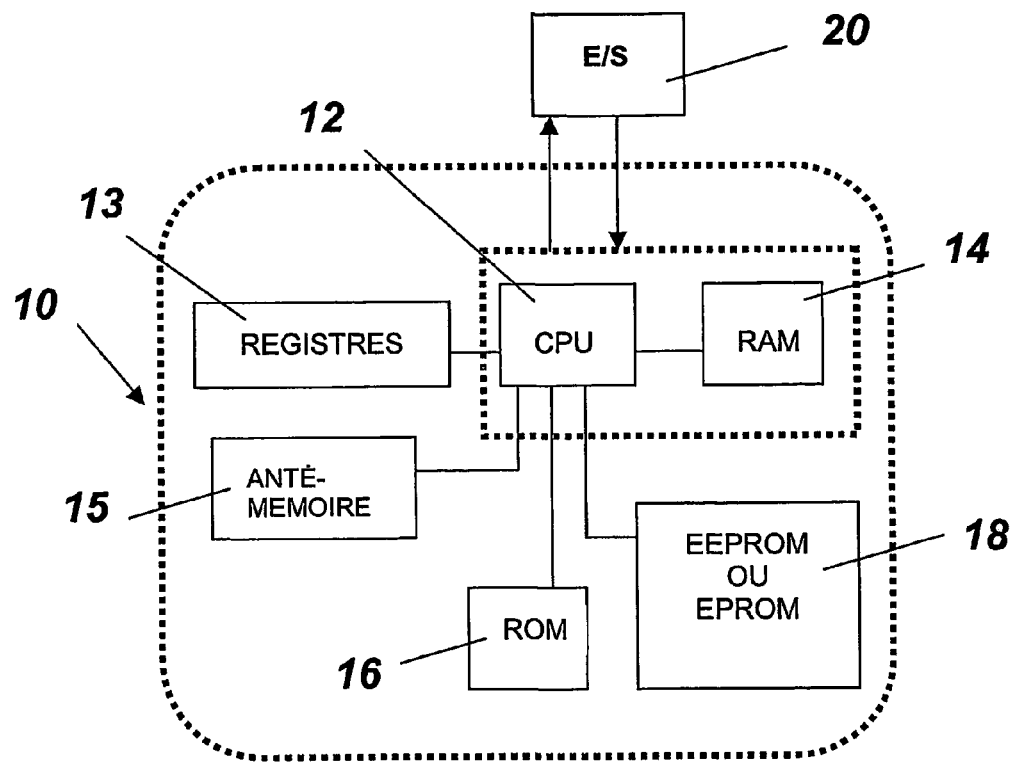
FIG - 1 (TECHNIQUE ANTÉRIEURE)
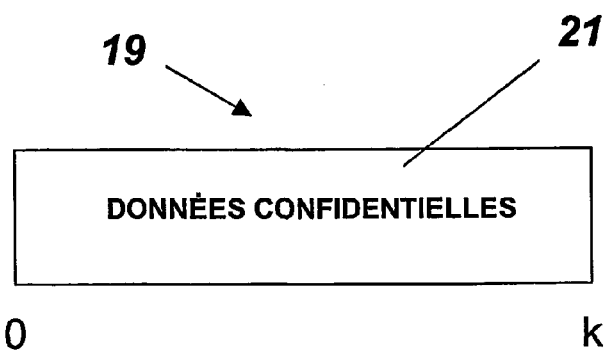
FIG - 2 (TECHNIQUE ANTÉRIEURE)

METHOD AND SECURING ELECTRONIC DEVICE DATA PROCESSING

FIELD OF THE INVENTION

The present invention relates to electronic devices. More specifically, the present invention is concerned with a method for securing the internal process of electronic devices.

BACKGROUND OF THE INVENTION

Smart cards, as a particular embodiment of electronic devices, were initially conceived to enhance the security of distributed systems. Applications of smart cards include, for example, calling cards, identification cards, medical cards, transaction cards (credit/debit bank, store, restaurant, etc.) and security cards. All of these applications require sensitive and confidential data to be processed within the smart card.

As can be seen from FIG. 1, which is labelled as "Prior Art", an electronic device 10 conventionally includes a Central Processing Unit (CPU) 12, which is the primary controller/processor of the electronic device 10. The CPU 12 can optionally include a large number of internal registers 13, as, for instance, in RISC (Reduced Instruction Set Computer) processors.

The electronic device 10 also includes a volatile memory in the form of a Random Access Memory (RAM) 14, Read Only Memory (ROM) 16, Electrically-Erasable Programmable Read Only Memory (EEPROM) 18 and optionally Cache Memory 15, all coupled to the CPU 12. For a better understanding of the following description, the term volatile memory used hereafter may include RAM, Internal Registers and/or Cache Memories.

An Input/Output (I/O) device, such as a terminal 20, allows the smart card 10 to share data with a distributed system (not shown), by controlling Inputs/Outputs to and from the electronic device 10, via the CPU 12. The smart card 10 includes an I/O port (not shown) for transferring data to and from the Input/Output device 20.

The CPU 12 processes instructions to manage data stored in the electronic device and includes a program that ensures protection against access to the sensitive and/or confidential data contained and processed in the smart card 10 by non-authorized entities, such as, for example, hackers. Indeed, in many instances, the sensitive and/or confidential information contained or processed in the device is of significant value (financial or otherwise) to its owner.

It has been found that some breaches were left, in protection of data, against various kinds of attacks such as the so-called "side channel attacks" that include, for example, "Power Analysis" and "Radio Frequency (RF) Analysis".

Power Analysis is based on measurement of power consumption during the processing of confidential binary coded information in a smart card. RF Analysis consists in intercepting and analyzing the radio frequency emitted during the transfer of confidential data. These two types of attacks use either the variation of energy consumption or the variation of emitted RF radiation during processing of the confidential data. Knowing one of these variations makes it mathematically possible to retrieve the confidential data.

Indeed, conventional secure programs used in electronic devices comprise a means to temporarily store confidential data in the volatile memory at a given predetermined memory location since, for performance purposes, it has been found to be preferable to work with fixed memory locations. Hence, only the confidential data might be changing in the storing and reading process since the memory location does not change. In such cases, when the CPU is processing confidential data, for example when confidential data is transferred from the CPU to the volatile memory, hackers may attempt to retrieve the confidential data using "side channel analysis" or another similar attack.

Conventional algorithms used for allocating memory in device 10, such as Dynamic Memory Management (DMM), are not sufficient to properly protect against attacks the confidential data processed therein. Indeed, conventional DMM algorithms are predictable, since they follow conventional rules. Therefore, if a given process is executed twice and under the same conditions, the same memory allocation should be expected. FIG. 2, which is labelled as "prior art" illustrates a dedicated area 19 where confidential data 21, having a size k, is stored.

SUMMARY OF THE INVENTION

In accordance with the present invention, there is provided a method for securing data storage in a volatile memory of an electronic device, the method comprising:

defining a dedicated area in the volatile memory; the length of the dedicated area being at least equal to the length of the data to be stored;

randomly defining an offset from the beginning of the dedicated area; and transferring the data to the dedicated data area at a memory location determined by the offset;

whereby the data is transferred to a randomly determined memory location in the dedicated area.

According to another aspect of the present invention, there is providing a device for securing data storage in a volatile memory of an electronic device, comprising:

means for defining a dedicated area in the volatile memory; the length of the dedicated area being at least equal to the length of the data to be stored;

means for randomly defining an offset from the beginning of the dedicated area; and means for transferring the data to the dedicated data area at a memory location determined by the offset;

whereby the data is transferred to a randomly determined memory location in the dedicated area.

According to yet another aspect of the present invention, there is also provided a secure electronic device for processing data received from an input/output device, the device comprising:

an Electrically-Erasable Programmable Read-Only Memory (EEPROM) for receiving the data from the input/output device;

an input/output port for transferring the data from the input/output device to the EEPROM;

a volatile memory for transferring the data during processing; the volatile memory including a dedicated area; the length of the dedicated area being at least equal to the length of the data to be transferred; and a data processing CPU comprising a random offset determining means and a data transfer means responsive to the random offset and interposed between the data and a memory location of the dedicated area determined by the offset.

The above and other objects, advantages and features of the present invention will become more apparent upon reading the following non-restrictive description of preferred embodiments thereof, given by way of example only with reference to the accompanying drawings.

BRIEF DESCRIPTION OF THE DRAWINGS

In the appended drawings:

FIG. 1, which is labeled "prior art", is a schematic block diagram illustrating the major elements of an electronic device;

FIG. 2, which is labeled "prior art", is a schematic illustration of a dedicated area in a volatile memory as managed by conventional electronic devices of the prior art.

DESCRIPTION OF THE PREFERRED EMBODIMENT

In a nutshell, the present innovation consists of a method for securing electronic device data processing by using a random memory location for the storage of confidential data.

In this manner, the method according to the present invention hinders confidential data retrieval by means for instance of a side channel signal analysis during confidential data processing therein.

The method of the invention also makes the side channel analysis more complex during secret processing by adding an unknown parameter, i.e., a random memory location, in a data area provided in the volatile memory of the electronic device. This method can be embodied within the electronic device 10 through, for example, a digital software.

A first embodiment of the method of the present invention will now be described with reference to FIGS. 3 and 4.

Figure 3:
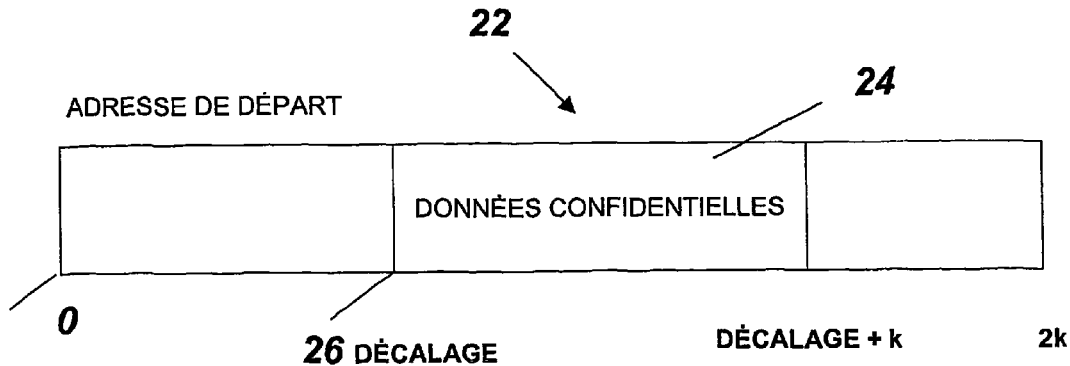
FIG. 3 is a schematic illustration of a dedicated area where confidential data has been stored according to a first embodiment of the present invention.

As it can be seen from FIG. 3, the first embodiment of the method of the present invention involves a dedicated area in a volatile memory 22 having a length (2k) that is larger than the length (k) of the confidential data 24 to be stored therein. It is to be noted that since the confidential data 24 is usually of a predetermined and known length, the length of the dedicated area 22 may also be predetermined. In the illustrative example of FIG. 3, the length of the dedicated area 22 has been selected as being twice the length of the confidential data 24.

As can be seen from FIG. 3, the confidential data 24 is not necessarily stored at the beginning of the dedicated area 22, but starts at a random memory location within the dedicated area 22 that is determined by an offset value 26.

Thereby, during the confidential data processing, the address where the confidential data is stored or transferred will be different at each execution, making the so-called side channel analysis more complex.

Figure 4:
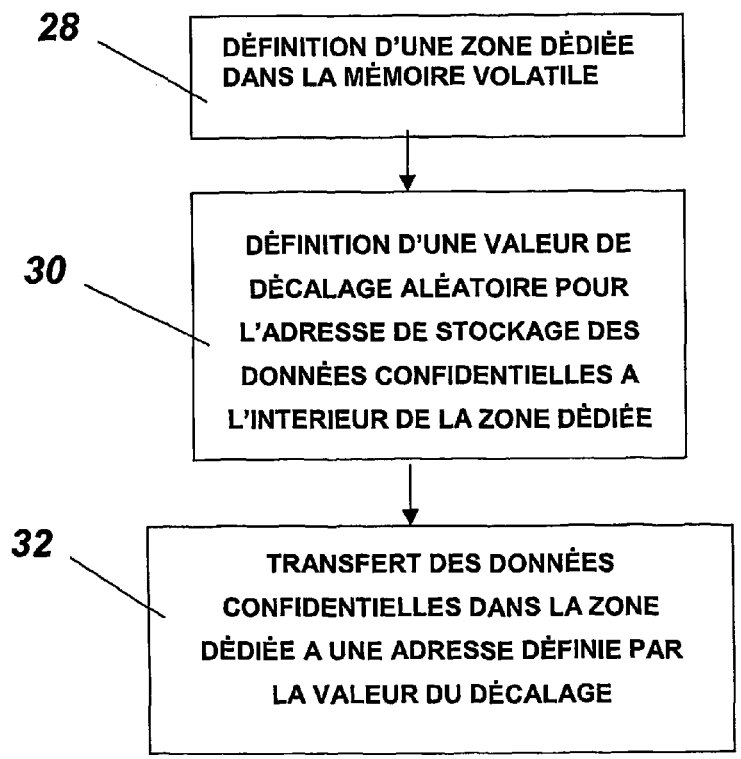
FIG. 4 is a flow chart of a method for randomly allocating a volatile memory area according to a first embodiment of the present invention.

Turning now briefly to FIG. 4 of the appended drawings, the method for allocating memory according to the first embodiment of the present invention will be described.

The first step 28 consists of defining a dedicated area 22 in a volatile memory 14 of the electronic device 10. Such dedicated area 22 in a volatile memory 14 may be referred to as a RAM buffer. The dedicated area 22 has a predetermined length (in this example 2k).

In the second step 30, a random offset value 26 is defined for the storing address of the confidential data 24 within the dedicated area 22. As described hereinabove, confidential data 24 is stored in the volatile memory 14 at the storing address defined by the starting address 23 of the dedicated area 22 plus the offset 26.

It is to be noted that since the entire confidential data 24 has to be stored in the dedicated area 22, the random offset 26 must be randomly chosen so as to prevent the confidential data 24 from exceeding the dedicated area 22. This can be achieved by selecting a random number between zero and the difference between the length of the dedicated area 22 and the length of the confidential data 24 minus 1.

In the example of FIGS. 3 and 4, since the length of the confidential data 24 is k and the length of the dedicated area 22 is 2k, the offset 26 should not exceed the value k−1 (2k−k−1) to prevent memory overflow.

In step 32, the confidential data 24 is transferred from the non-volatile memory 18 at the address defined by the start address 23 of the dedicated area 22 in the volatile memory 14 plus the offset 26. The expression transferred is intended here to include storing, accessing or any other operation performed on the confidential data 24.

As can easily be understood by those of ordinary skill in the art, since the location of the confidential data 24 is known by the CPU, the confidential data 24 may then be processed or accessed directly from its location in the dedicated area 22 in the volatile memory 14.

Hence, each execution of the process will transfer the confidential data 24 at a random memory location in the dedicated area 22, even if the process is repeated many times in the same conditions. Thereby, a side channel analysis will have to consider two unknown parameters: the confidential data value 24 and its address. This kind of analysis becomes much more difficult to perform since it requires finding two equations or relations between the side channel signal and the parameters.

In other words, the data 24 is transferred to a randomly determined memory location in the dedicated data area 22, thereby rendering more difficult the analysis and subsequently the attacks (e.g. side channel attacks).

As will be easily understood by those of ordinary skill in the art, depending on the length of the volatile memory 14 of the electronic device 10, the dedicated area 22 defining step 28 may be omitted, for instance, in case of static memory management where a dedicated area is defined during program compilation/link.

A second embodiment of the method of the present invention will now be described with reference to FIGS. 5 and 6.

The main distinction between the first and second embodiment resides in the approach used to store the confidential data in the dedicated area. In this case, the dedicated area 100 has the same length as the confidential data 102 to be stored therein.

Indeed, it has been found that instead of providing a dedicated area larger than the data to be stored therein, it is possible to provide a dedicated area having the same length and to loop the confidential data 102 when the end of the dedicated area 100 is reached. This way, it is possible to provide the improved security of the present invention while optimizing the use of the limited amount of volatile memory typically provided in electronic devices (e.g. smart cards).

Figure 5:
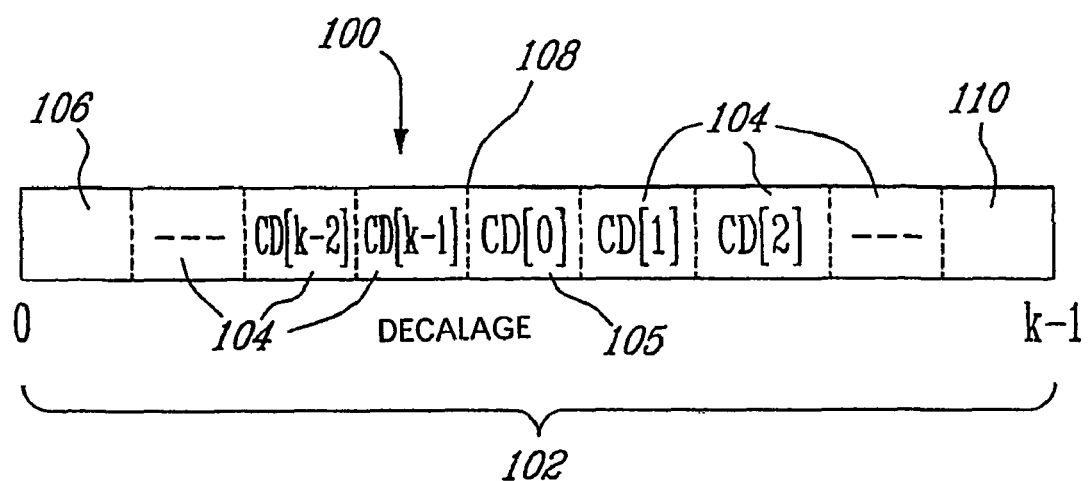
FIG. 5 is a schematic illustration of a RAM buffer where confidential data has been stored according to a second embodiment of the present invention.

More specifically, as shown in FIG. 5, and for illustration purposes, each bit of the confidential data 102 has been illustrated separately with its position in a memory location 104, 105, 106 and 110 in the dedicated area 100 shown in bracket, i.e. CD[0] for the first bit of the confidential data 102 and CD[k−1] for the last one.

The confidential data 102 is stored in the dedicated area 100 starting at a memory location 105 determined by the beginning of the dedicated area 22 and by a random offset 108. However, the confidential data 102 is looped to the beginning 106 of the dedicated area 100 once the end 110 of the dedicated area 100 is reached. Therefore, depending on the offset value 108, each bit of the confidential data 102 can take any memory location in the dedicated area 100.

Figure 6:
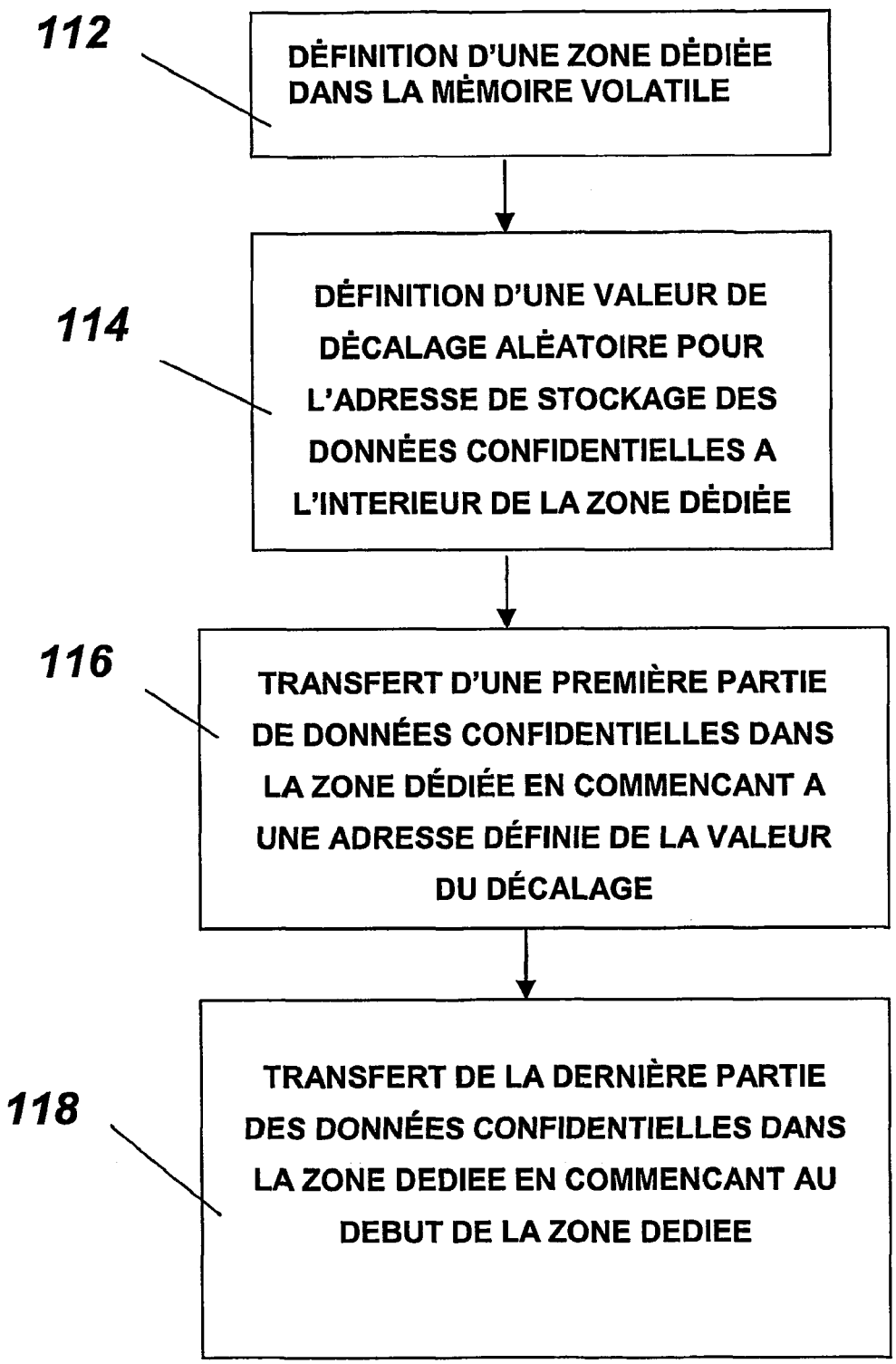
FIG. 6 is a flow chart of a method for randomly allocating memory according to a second embodiment of the present invention.

FIG. 6 summarizes the method according to this second embodiment.

In step 112, a dedicated area 100 (RAM buffer) is defined in the volatile memory 14. The dedicated area length is advantageously the same as the confidential data length.

In step 114, a random offset 108 is defined for the storing address of the confidential data 102. Again, the value of the offset ranges from zero (0) to k−1 In step 116, the first part of the confidential data 102 is transferred to the dedicated area 100 at the address defined by the offset 108. The length of the first part of the confidential data 102 corresponds to the difference between the length of the dedicated area and the offset 108.

In step 118, the last part of the confidential data 102 is transferred at the beginning of the dedicated area 100.

Consequently, the obvious advantage of this second embodiment is the optimization of the volatile memory 14.

Again, since the location of the confidential data is known by the CPU 12, the confidential data 102 can be processed or accessed directly from its location in the dedicated area 100.

It is to be noted that even though the two embodiments of the method of the present invention described hereinabove have been presented as independent secure processes against attacks (e.g. side channels) for the smart card technology, they can advantageously be combined with other conventional security features of smart cards.

It is also within the scope of the present invention to combine the two embodiments in a method where the dedicated area is made longer than the confidential data to be stored therein and where the confidential data would be looped to the beginning of the dedicated area should the end of the dedicated area be reached. This would allow the offset to be randomly chosen from the entire dedicated area.

As will easily be understood by one skilled in the art, even though the present invention has been described hereinabove as being advantageous when confidential data is transferred from the CPU to the volatile memory of a smart card, the term "transfer" should be construed as including the direct generation of confidential data in the volatile memory by the CPU and not merely the "transfer" therefrom. Similarly, the present invention is also advantageous when confidential data is transferred from the non-volatile memory to the volatile memory of the electronic device.

Optionally, the offset value may be chosen at random at the beginning of a session instead of being chosen at the beginning of each storage operation.

As will also be apparent to one skilled in the art, the nature of the electronic device is not limited to smart cards as described hereinabove. Indeed, the method of the present invention could be advantageously implemented in other types of electronic devices such as, for example, Personal Digital Assistant (PDA) and cellular phones.

Although the present invention has been described hereinabove by way of preferred embodiments thereof, it can be modified, without departing from the spirit and nature of the subject invention as defined in the appended claims.

What is claimed is:

1. A method for securing data storage in a volatile memory of an electronic device, said method comprising:

defining a dedicated area in the volatile memory, the length of the dedicated area being equal to the length of the data to be stored;

randomly defining an offset from the beginning of the dedicated area;

transferring a first part of the data to the dedicated data area at a memory location determined by the offset, wherein the length of the first part corresponds to the difference between the end of the dedicated area and the offset; and transferring a second part of said data to a memory location corresponding to the beginning of the dedicated area.

2. A device for securing data storage in a volatile memory of an electronic device, comprising:

means for defining a dedicated area in the volatile memory, the length of the dedicated area being equal to the length of the data to be stored;

means for randomly defining an offset from the beginning of the dedicated area; and means for transferring an initial portion of the data to the dedicated data area at a memory location determined by the offset, wherein said initial portion has a length corresponding to the difference between the end of the dedicated area and said offset, and thereafter transferring the remaining portion of said data to a memory location corresponding to the beginning of the dedicated area.

3. The device according to claim 2, wherein the means for randomly defining an offset comprises means for preventing the transferred data from exceeding the dedicated area.

4. The device according to claim 3, wherein the means for preventing the transferred data from exceeding the dedicated area comprises means for choosing as the offset a number located between zero and the difference between the length of the dedicated area and the length of the confidential data minus one.

5. A secure electronic device for processing data received from an input/output device, said device comprising:

an Electrically-Erasable Programmable Read-Only Memory (EEPROM) for receiving the data from the input/output device;

an input/output port for transferring the data from the input/output device to the EEPROM;

a volatile memory for transferring the data during processing, said volatile memory including a dedicated area, the length of the dedicated area being at least equal to the length of the data to be transferred; and a data processing CPU comprising a random offset determining means and a data transfer means responsive to the random offset, wherein the data transfer means is adapted to:

transfer a first part of the data to the dedicated data area at a memory location of the dedicated area determined by the offset, said length of the first part corresponding to the difference between the end of the dedicated area and the offset, and transfer a second part of said data to a memory location corresponding to the beginning of the dedicated area.

6. A device according to claim 5, wherein said volatile memory is selected from the group consisting of Random Access Memory (RAM), Internal Register and Cache Memory.

7. A device according to claim 5, wherein the electronic device is selected from the group consisting of a smart card, a Personal Digital Assistant (PDA) and a cellular phone.

* * * * *